(No Model.)
W. J. CHENOWETH.
THILL COUPLING.
No. 246,289. Patented Aug. 30, 1881.
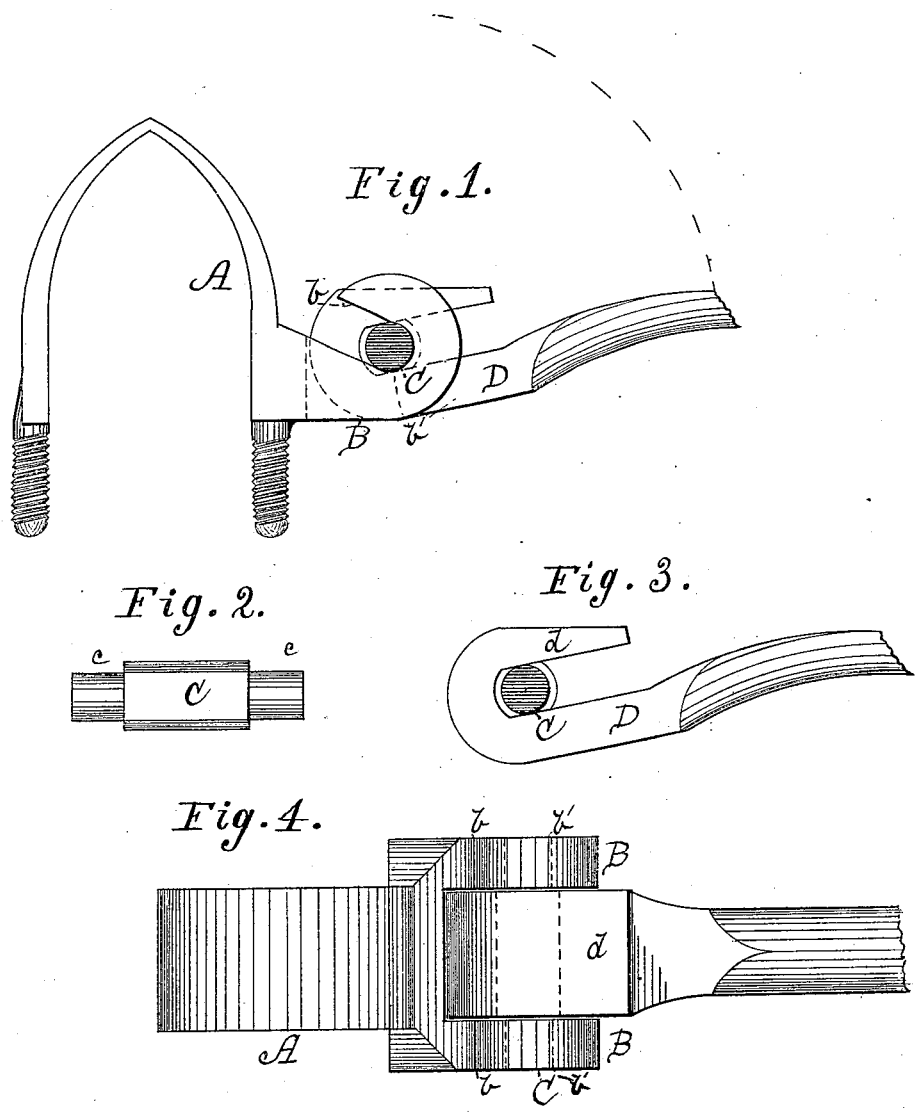
Witnesses:
John B. Bixy,
Wm B Fuller
Inventor.
William J. Chenoweth
By John G. Dupec
Atty

UNITED STATES PATENT OFFICE.

WILLIAM J. CHENOWETH, OF DECATUR, ILLINOIS.

THILL-COUPLING.

SPECIFICATION forming part of Letters Patent No. 246,289, dated August 30, 1881.

Application filed July 2, 1881. (No model.)

*To all whom it may concern:*

Be it known that I, WILLIAM J. CHENOWETH, a citizen of the United States, residing at Decatur, in the county of Macon and State of Illinois, have invented a new and useful Improvement in Thill-Couplings, of which the following is a specification.

My invention relates to an improvement in thill and pole couplings, and has for its object to provide an efficient and simple construction of the parts to permit their convenient connection and disconnection while preventing their accidental disengagement when connected. I attain these objects by the device illustrated in the accompanying drawings, in which—

Figure 1 is a side elevation, showing the parts connected. Fig. 2 is a longitudinal view of the rock-shaft or draft-pin. Fig. 3 is a side view of the thill-iron, showing the position of the rock-shaft or draft-pin in the open eye thereof. Fig. 4 is a top view of Fig. 1 as it appears when connected.

Similar letters refer to similar parts throughout the several views.

A represents the clip, and is constructed with two forward-projecting arms, having holes therein to receive the rock-shaft or draft-pin C, said arms having longitudinal slots $b\ b$ cut from the surface the same width as and connecting with the holes $b'\ b'$, thus forming a kind of hook to allow the placing and removal of the rock-shaft or draft-pin C, each end of which is turned down smaller in diameter than the body, as shown at $c\ c$, Fig. 2, to fit the holes $b\ b$ of the clip, and allow them to turn therein.

The thill-iron B is made hook-shaped, the tang $d$ being long and flat, slightly tapering the flat way toward the point, so that when the thills are raised up perpendicular the points $d$ of the hook will pass down freely between the rock-shaft and clip, thus allowing the thill-iron to unhook, leaving the rock-shaft C still in the hooks of the clip. The rock-shaft may then be removed, if desired, by passing it up out of the slots $b\ b$. The rock-shaft or draft-pin, being larger in diameter in the middle, cannot slip laterally through the holes in the arms of the clip; hence no nuts are required to keep it in place, the larger part being flattened on two sides, as shown, to fit in the hook of the thill-iron and prevent its turning therein, but compelling it to turn or rock on its end journals in the hooks of the clip.

It is obvious that any suitable spring may be inserted between the rear of the thill-iron and clip by leaving more space; or the hook may be made cone-shaped on its face, so that when lowered to a certain point it will be tight, and thus prevent rattling.

The dotted line shown in Fig. 1 represents the movement of the thills when being uncoupled or coupled together. Its adaptability and its operation may be readily understood by reference to the drawings.

Having thus described my invention, what I claim, and desire to secure by Letters Patent, is—

1. The rock-shaft or draft-pin flattened on two of its sides to prevent turning in the thill-iron, and having journals on each end of a lesser diameter, thereby forming a shoulder to prevent lateral displacement, substantially as shown and described.

2. In combination with the rock-shaft and hooks of the clip, the thill-iron adapted to pass vertically onto said rock-shaft to connect the parts, the whole being constructed and arranged to operate as set forth.

In testimony whereof I have hereunto set my hand in the presence of two subscribing witnesses.

WILLIAM J. CHENOWETH.

Witnesses:
 JOHN B. BIXBY,
 WM. B. FULLER.